INVENTOR.
FRANK J. LUKETA
BY
Reynolds & Christensen
ATTORNEYS

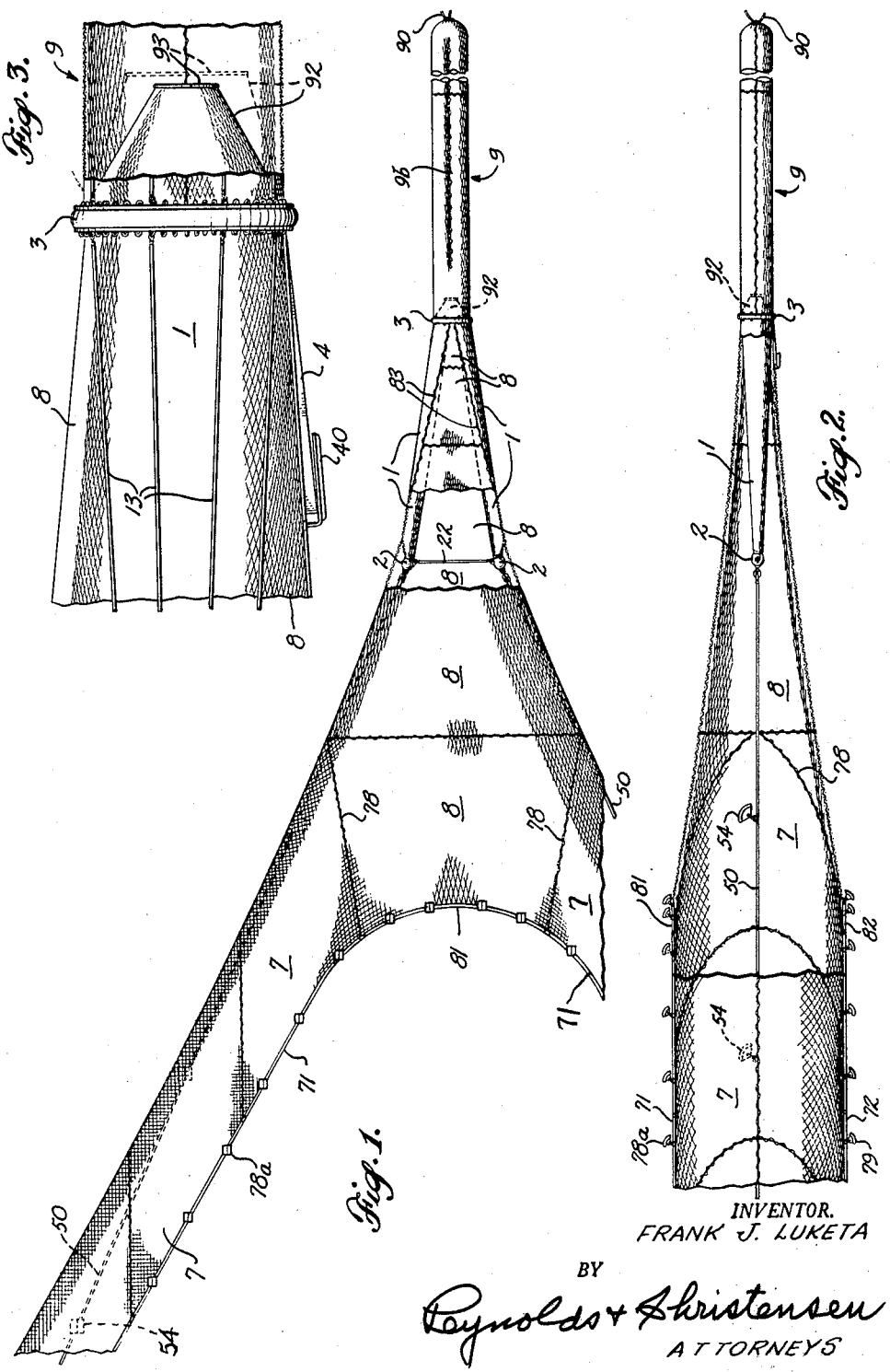

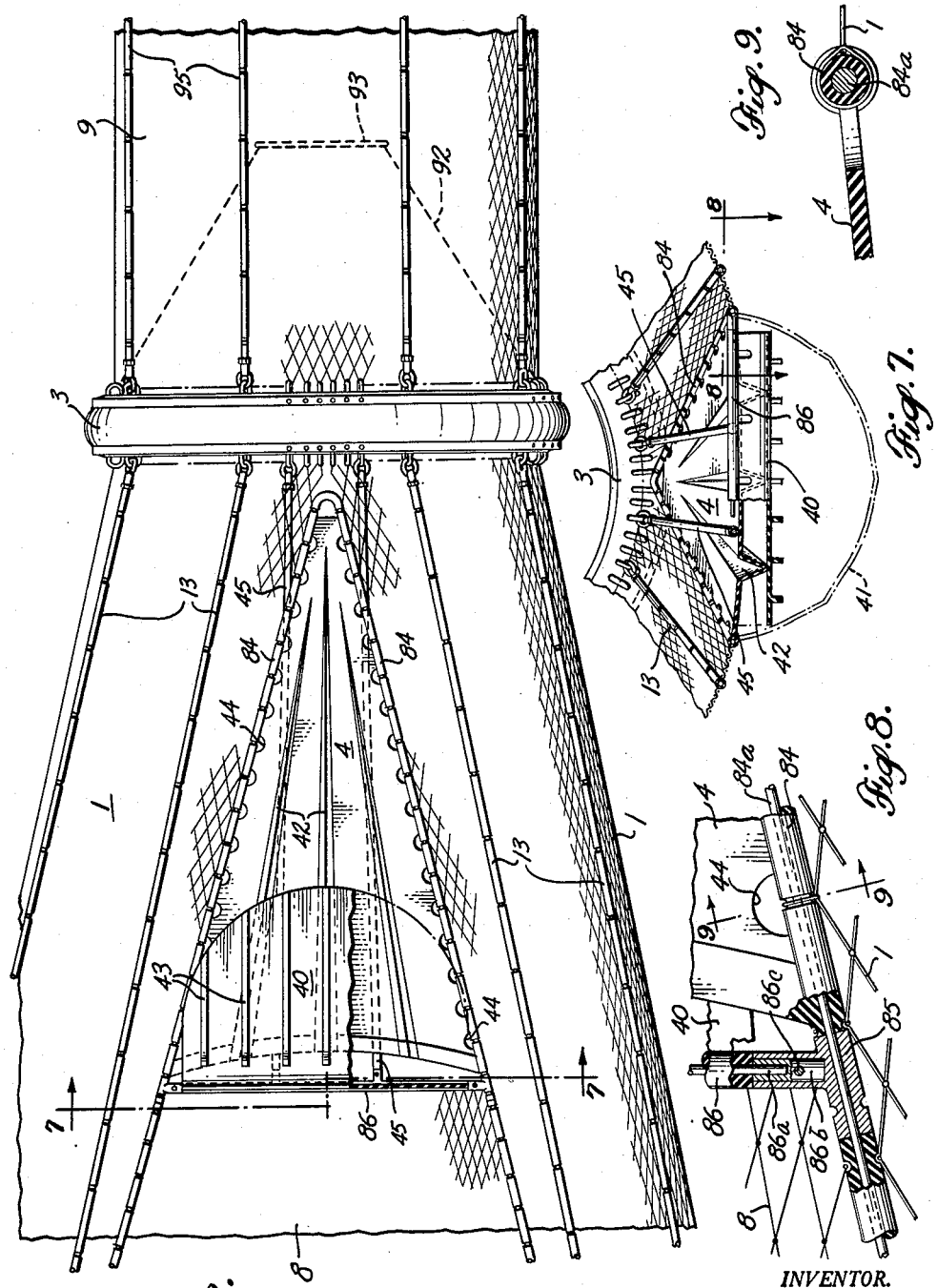

United States Patent Office 3,195,261
Patented July 20, 1965

3,195,261
SPILLER FOR TRAWL NETS
Frank J. Luketa, 5567 Greenwood Ave., Seattle 3, Wash.
Continuation of application Ser. No. 85,679, Jan. 30, 1961. This application Feb. 1, 1963, Ser. No. 256,202
21 Claims. (Cl. 43—9)

This application is a continuation of my application Serial No. 85,679, filed January 30, 1961, now abandoned.

The invention claimed herein concerns an individual component of a trawl net. That component, termed a spiller, has been disclosed in my application Serial No. 80,170, filed January 3, 1961, now abandoned, in conjunction with various other components of the net therein disclosed, but was not claimed therein. The present application deals with the spiller per se, and with the relationship of the spiller to the entrance to the codend, and to the funnel ahead of that entrance.

The invention is shown as part of a midwater trawl net, and would normally find its greatest usefulness in nets of that type. It could be used in a bottom trawl net, however, hence it is not to be restricted only to midwater nets.

Trawl nets include a codend open at its forward end, with a funnel converging aft towards its entrance to lead fish to the codend. That entrance is often held open by an expander ring, and a trap or closure of mesh within the entrance blocks escape of fish once they enter the codend. Sometimes a codend becomes so filled with fish that no more can enter, yet additional fish collect in the funnel, and the continued trawling operation, as also the operation of hauling the net, tend to force the additional fish back in the funnel towards the codend's entrance, and sometimes to collect still more free-swimming fish. This may impose such a load upon the mesh of the funnel during the hauling of the net that it is torn; moreover, it is wasteful of a valuable resource, the fish, for they can not be hauled aboard the trawler, and their presence in the funnel (in the event the funnel were made strong enough to prevent tearing) greatly impedes and delays hauling of the fully loaded codend. There are other reasons why the presence of such fish in the funnel is undesirable.

While it is possible, by use of load-sensing means such as is disclosed in my application Serial No. 52,141, filed August 26, 1960, to ascertain when the codend is approximately fully loaded, and to haul the net when that time arrives, it still does not guarantee that the net will not, during hauling, encounter and trap additional fish, with the results indicated above.

It is important, therefore, to arrange for escape from within the funnel, and especially from the after portion thereof, of fish collected there and unable to enter the codend. Such fish crowd the after portion of the funnel until they can scarcely move, and press upon its bottom; they can not swim forwardly to escape because the forward and upward movement of the net during hauling prevents this.

According to this invention advantage is taken of the pressure exerted by the fish of the funnel at a location ahead of the codend entrance, to depress a normally closed spiller panel incorporated in the funnel, and so to open an escape opening that persists as long as excess fish are gathered there, but that closes whenever the excess has been spilled. Because it opens only when excess fish are gathered there, and not during normal use of the net, while fish can enter the codend, it offers no escape for fish until after the codend is filled. Because it is of a nature and at a location, in relation to other parts of the funnel and codend, that it is not stressed during normal trawling, it has no tendency to close down at such time. It opens forwardly and downwardly, in the preferred form, hence is responsive to downward pressure of collected fish, yet it closes and is restrained from bellying upwardly into the funnel during trawling. It is the primary object of this invention to provide a spiller having the above capabilities and advantages, for use in the normal trawl net, yet one which will not obstruct normal trawling or hauling operations.

Associated objects are, to provide such a spiller of simple and rugged construction, which has the ability to expand and open as necessary for escape of fish but is self-contracting and self-closing otherwise, and which is readily incorporated in the net as part of the funnel. Other objects will appear more fully hereinafter.

The spiller is shown in the accompanying drawings, and will be described, in a representative and presently preferred form. The novel features of the invention will be defined in the claims.

FIGURE 1 is a plan view of a midwater trawl net, partly broken away, illustrating the relationship of the spiller of this invention to the other components of the net, during trawling.

FIGURE 2 is a partial side elevation and partial section longitudinally of the net, to the same scale as FIGURE 1.

FIGURE 3 is an enlarged side elevational view, partly broken away, of the components in the immediate vicinity of the spiller.

FIGURE 5 is in part a longitudinal vertical section, and in part a side elevation of the same, but showing the spiller in full lines distended for escape of excess fish during hauling in.

FIGURE 6 is a bottom plan view of the spiller and associated parts, in positions corresponding to FIGURES 3 and 4.

Figure 4:
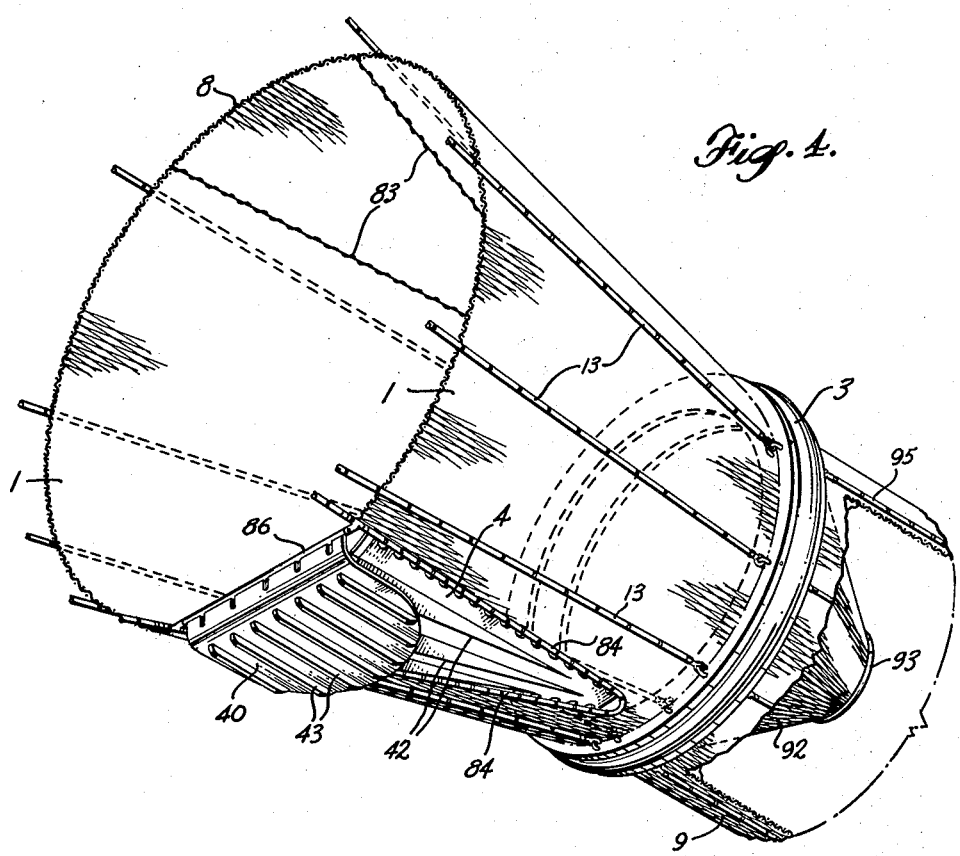
FIGURE 4 is an isometric view from the side, looking upwardly and aft, of the same components as in FIGURE 3, in their normal positions during trawling.

FIGURE 7 is a section on the line 7—7 of FIGURE 6.
FIGURE 8 is a section on the line 8—8 of FIGURE 7.
FIGURE 9 is a section on the line 9—9 of FIGURE 8.

The function of the spiller of this invention will be best understood if it be first explained that the net wherein it is intended to be incorporated is one having a codend of a capacity in excess of one hundred tons of fish in a single haul, which is to be hauled by what is known as the drum trawling method. The distinctive feature of the method, insofar as pertinent here, is that hauling lines aboard the trawler are connected, during hauling, between the codend and drums aboard the trawler, and by a continuous reeling in onto such drums the net's curtains and funnel, or at least a part thereof, are wound onto the drums and in a minimum of time drag the loaded codend over the stern and onto the trawler's deck. The codend is of a twine and mesh size to resist rupture when loaded to its full capacity and if filled to that limit no more fish can enter the codend, yet they can not themselves escape from the forwardly divergent funnel which immediately precedes and leads them into the codend's open forward end, for reasons given above. If it were attempted to haul the net with excess fish trapped within the funnel and unable to escape, several undesirable results might follow. For one, the loaded and forwardly spreading funnel would be of a breadth in excess of guides at the stern between which the net is guided during hauling, and the codend could not be hauled on deck because of interference between the bulging funnel and these guides. The excess within the funnel would have to be unloaded by manual labor or otherwise relieved, and such fish, as well as many within the codend, would be damaged, or might be subjected to attack by predatory fish. The hauling would be greatly delayed, and the number of sets during a day reduced. There would be excessive wastage of fish, a valuable natural resource. The light twine mesh of the funnel would be subject to damage, and repairs would cost time and money.

Accordingly, the spiller of this invention is incorporated in such a net, and is of such construction and arrangement that while it remains closed during trawling operations, it will open automatically under the pressure of excess fish in the funnel, and because it is located immediately ahead of the codend's entrance it will allow the entire excess to escape from the funnel, without injury to them or damage to the net, during the hauling in operation, whereby the excess fish are left to be caught by subsequent trawling operations. The hauling can therefore proceed without interruption, and subsequent resetting of the net is quickly accomplished.

FIGURES 1 and 2 show the locations of the several components of such a net for midwater trawling, and of the spiller relative thereto. The codend at 9 trails after a forwardly divergent funnel 8, both being connected to an expander ring 3 which is rigid during trawling and which holds open the entrance to the codend. Curtains 7 spread laterally ahead of the funnel to which they are laced at 78, being pulled by doors (not shown) to which curtain lines 71, 72 are secured at their forward ends. The after ends of opposite curtain lines 71, 72 are joined by bosom lines 81, 82 respectively, to which the upper and lower bosoms of the net are laced. Planing buoyant members or floats 78a, or other means to the same end, buoy up curtain lines 71 and bosom line 81, and similar planing devices or weights 79 depress curtain lines 72 and bosom line 82. The ring 3 may be of metal or of other suitable material or construction.

The codend 9, closed during trawling at its after end by purse line 90, is dragged not by the light mesh of the funnel or curtains, but by suspenders 1 which are of heavy twine, to the forward end of each of which at the connectors 2 a sweep line 50 is secured, extending forwardly to the door, and buoyed up by floats 54 similar to those at 78a. The opposite connectors at 2 are joined by a restrictor 22. Each suspender is incorporated within and as part of the funnel, being laced thereto at its edges at 83, yet does not impose any stress upon the funnel. At its after edge each suspender 1 extends half-way about the codend's open forward end, and is secured thus to the intervening expander ring 3. The lower light mesh panel of the funnel converges aft towards a point at the ring 3. Riblines 13 (see FIGURE 3) are incorporated in the suspenders to limit tears.

When all the fish that can enter the codend 9 have passed through the expander ring 3 that defines its forward opening, and through the non-return entrance or closure 92 also secured to the ring 3, and closed by its rear contractile band 93, the closure 92 (commonly termed a trap) prevents their escape, but fish in excess of the codend's capacity crowd together within the funnel 8 just ahead of the ring 3. Accordingly, the spiller 4 is located just ahead of the ring, and is in effect a part of the funnel, at the extreme point of the substantially unstressed lower panel thereof. It is preferably incorporated in the bottom of the funnel, so that when pressed downwardly by a crowded mass of fish above, during hauling in, it will yield downwardly and allow them to escape.

Figure 5:
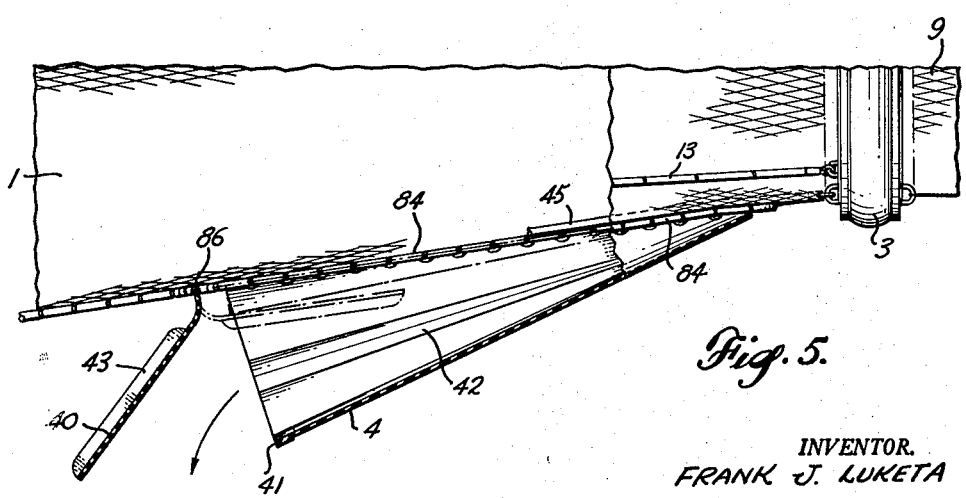

The spiller 4 is of any shape suitable to its location, being shown as of generally triangular shape (see FIGURE 6) to fit the portion of funnel mesh which it replaces, between the opposite lacings 84 which join the suspenders to the funnel. It is formed preferably of molded sheet rubber, and is located at the exterior of the funnel to open outwardly thereof. In order to afford it lateral expansion at its free forward edge 41, so that it can bulge downwardly under pressure of excess fish in the funnel, yet will contract and close upwardly when that pressure is relieved or non-existent, it is pleated longitudinally at 42, and the pleats tend to remain contracted. A forward flap 40, also preferably of rubber, but stiffened by its ridges 43, is secured across its forward edge to the transverse line 86 so that it may hinge downwardly, but during trawling the water reaction due to forward movement of the net holds it upwardly against and beneath the downwardly opening free forward edge 41 of the spiller 4; see FIGURES 3 and 4, and compare the full line and dot-dash line showings of FIGURE 5. The flap 40 is a convenience and an assurance that the spiller will be kept closed, even though it opens forwardly, but is not essential.

The transverse line 86 extends between forwardly divergent lines 84, reinforced by cable 84a, which define the line where the suspenders 1 and mesh panels of the funnel 8 are laced together. Whatever tendency arises from longitudinal stress on these lines 84 tends to separate them rather than to close them. The side edges of the spiller 4 are laced thereto, in lieu of a netting panel at this location; see FIGURE 9. Longitudinal stress on the lines 84 tends rather to flatten the spiller, than to cause it to belly. The spiller is notched at 44, along its edges, for passage of the lacing twine. Spiller control lines 45 extend longitudinally between transverse line 86 and the expander ring 3, above the spiller 4. Since they stretch longitudinally across the spiller opening, above the spiller 4 (see FIGURE 7) they guard against upward bellying of the spiller, but do not restrict its downward bellying as is shown by comparison of the full line and dot-dash line showings in FIGURE 7. They do not obstruct escape of fish. Riblines 13 extend lengthwise of the suspenders 1, to limit lateral tearing of the latter. Prevention of the upward bellying of the spiller is very important as upward bellying will result in the spiller opening always being open to fish whereupon incoming fish can be guided out of the net even though the codend is not full.

The preferred form of joint between lines 84 and 86 is shown in detail in FIGURE 8. These lines are preferably rubber-jacketed, with the rubber notched at lacing intervals. A special angle joint element 85 of aluminum or the like takes the place of equivalent lengths of rubber in each of the lines 86, 84. The wire core 86a at the end of line 86 is swaged or otherwise secured strongly within an axial bore of a metal plug 86b, which in turn is received within a socket in an arm of angle joint element 85, and is pinned in place by roll pin 86c. The flap 40 is preferably formed integrally with the rubber jacket of line 86.

Riblines 95 may be laced along the codend 9, for a purpose similar to that of riblines 13. The codend is preferably of large diameter, so that a sufficient number of heavy twine meshes may be incorporated within it in order to withstand the very heavy stresses placed upon it during hauling, and to reduce its dimensions sufficiently that it may be hauled between spaced-apart guides at the trawler's stern, its top and bottom are laced together along the line 9b. It is the spacing between such guides that would be exceeded by the lateral spread of a bulging funnel filled with excess fish, and which is one of the reasons for the use of this spiller. A funnel fully distended with fish could bulge to a diameter of fifty feet or more, for example.

Trawling proceeds in the normal manner, and when the codend is fully loaded, as can be determined by load-sensing means aboard the trawler, such as those disclosed in my application Serial No. 52,141, filed August 26, 1960, hauling of the net begins. The net is usually rather distant from the trawler, both astern and in depth, and during hauling may gather in additional fish, which being unable to enter the filled codend collect in the rear of the funnel—the net by now being hauled forwardly and somewhat upwardly while the trawler is moving. The excess fish, however they may have collected, produce increasing pressure upon the spiller 4 as the net nears the surface, and this being flexible, its pleats 42 yield and it bellies downwardly, as the flap 40 swings out of the way. The spiller control lines 45 do not impede escape of the fish, and they pass out by way of the opening thus provided, yet fish within the codend can not escape because of forward movement of the net as well as because of the closure 92. The fish escape thus long before the funnel is hauled out of the water, and are not injured. The funnel when it comes aboard the trawler is cleared of fish, and there being nothing to distend it, it easily passes between the side guides mentioned and onto the drum, with no halting or clearing necessary. The codend follows onto the deck, the side guides being spaced apart sufficiently to pass the same when fully loaded, and so the catch is most expeditiously unloaded and the net reset.

The description has been directed to a midwater trawl net and operation, but the spiller is also useful (although not so necessary) in bottom trawling. The rubber flap 40 in effect contacts the bottom during bottom trawling, and is thus held closed over the edge 41 of the spiller, or is held off the bottom by large bobbins, and the flap is kept closed in the same manner as in the midwater net. In bottom trawling sheets of rubber chafing gear cover the bottom of the funnel and codend and thus protect it from wear. The spiller panel is of like wear-resistant material. As soon as the net, during hauling, is lifted from the bottom the spiller can belly downwardly for escape of excess fish when they press against it. In a bottom trawl net, however, the funnel is shorter fore and aft in its bottom portion relative to its overhang at its top, hence when the net is raised off the bottom there is a greater chance for excess fish to escape over and beneath the short lower bosom, than is the case in a midwater net wherein both bosoms are of like and considerable longitudinal extent. However, no restriction in the application of the invention to midwater nets is intended, except as may be specifically stated in individual claims.

The present invention designed primarily for a midwater trawl net, and located at a particular location, where it opens downwardly to relieve the internal pressure of excess fish, and where it is not stressed during normal usage, is to be distinguished from known nets used in bottom trawling and formed with pockets that are located promiscuously over the bottom of the funnel, and that are intended to open upwardly into the funnel, solely for the purpose of releasing rocks and the like that are dredged off the bottom and into the funnel. If such pockets can open to release rocks, they can also open to permit escape of fish during normal trawling even though the codend may have little or no fish in it. Being of mesh and located where they are stressed in use, they will tend to contract laterally, and so will either belly upwardly so fish can always escape, or will tighten and close down so that they will serve no useful purpose. Being located at no particular location, they can not relieve the pressure of excess fish that gather at one particular location e.g. the lowest point of the funnel during hauling.

I claim as my invention:

1. A trawl net comprising a codend open at its forward end and closed during use at its after end, a funnel disposed ahead of the open forward end of the codend, to lead fish thereinto, said funnel having top, bottom, and side walls, and formed with an opening in its bottom immediately ahead of the entrance to the codend, and a spiller panel supported along the edges of said opening but free at one edge, and means to close the opening by the spiller panel normally, but permitting it to open under pressure of excess fish gathered ahead of the entrance to the codend, to permit their escape.

2. A trawl net as in claim 1, wherein the spiller panel is free at its forward edge, and the means to close the same includes pleating incorporated in the panel and biased to flatten the same.

3. A trawl net as in claim 1, wherein the spiller panel is free at its forward edge, to belly downwardly by pressure of escaping fish, and the means to close the same includes a flap supported by the funnel ahead of the panel's free edge, and normally underlying the same by water reaction.

4. A trawl net as in claim 1, wherein the spiller panel's free edge bellies downwardly except as held closed by the closing means, and lines spanning the bottom opening, above the spiller panel, to restrain its upward bellying.

5. A trawl net as in claim 1, including cables converging rearwardly substantially to a point, and secured to and defining the side edges of the opening and of the spiller panel, the latter being free at its forward edge only.

6. A trawl net as in claim 1, including a non-return closure means at the entrance to the codend, arranged to admit fish up to the capacity of the codend, but to prevent escape of fish by way of such entrance.

7. A trawl net comprising a codend open at its forward end and closed during use at its after end, an open expansion ring about which the forward end of the codend is secured, to keep the same open, a funnel including top, bottom, and side walls diverging forwardly from and joined to said expansion ring, a sleeve-like closure within the codend, secured about its forward end to the expansion ring and tending to constrict at its after end, to allow entrance of fish to the full capacity of the codend, but to obstruct exit thereof, said funnel having a spill opening in its bottom located substantially immediately ahead of said expansion ring and said sleeve-like closure, said bottom terminating at the periphery of said spill opening, and closure means constituting a sole cover for such opening, said closure means normally closing said spill opening to fish in the net while the net is in normal use, but being yieldable downwardly to open by the weight of excess fish in the funnel pressing against it during hauling, generally normal to the general plane of said spill opening, with the excess fish being spilled by way of said spill opening when said closure means is urged downwardly by said excess fish.

8. In combination with the codend of a trawl net, which during use is open at its forward end but closed at its after end, and with a funnel having walls diverging forwardly from such open forward end, and itself having an opening in its bottom located immediately ahead of the codend's open end, closure means secured to the funnel along the sides and rear of said bottom opening, and free to distend downwardly at its forward end, but inherently tending to remain in upraised position to close the bottom opening, said closure means being yieldable downwardly under the weight of an excess of fish within the funnel to permit escape of such excess.

9. In combination with the codend of a trawl net, which during use is open at its forward end, and a funnel having walls diverging forwardly from such open forward end, and itself having an opening extending forwardly in its bottom immediately ahead of the codend's open end, a spiller panel secured in and of a size to close the funnel's bottom opening, and secured along its edges to the funnel except across its forward edge, and there being free and of a lateral extent to expand and belly downwardly, to define an escape opening, and a flap mounted upon the funnel across the forward edge of its opening, and during trawling being held backwardly beneath the free edge of the spiller panel, by water reaction, to retain the spiller panel in position to close the bottom opening of the funnel, but being swingable to move downwardly, and thereby to permit downward bellying of the spiller panel, under the influence of excess fish pressing downwardly upon said spiller panel.

10. The combination of claim 9, wherein the spiller panel is formed with a plurality of longitudinal pleats, each biased to close and thereby contract the panel as a whole, but yieldable for bellying thereof downwardly under the influence of the pressure of excess fish.

11. The combination of claim 9, including further spiller control lines spanning the funnel's bottom opening, to block upward bellying of the spiller panel.

12. The combination of claim 11, wherein the control lines are each connected at one end to the forward edge of the funnel's bottom opening, are spaced apart, and extend aft to anchorages adjacent the rear end of such bottom opening.

13. In combination with the codend of a trawl net, which during use is open at its forward end, an expander ring defining such open end, whereto the codend is secured, a contractile non-return entrance closure also secured to said expander ring and directed within the open end of the codend, a funnel having walls diverging forwardly from and secured to said expander ring, said funnel having a bottom opening immediately ahead of the expander ring, the forward edge of said opening being directed transversely, an expansible spiller panel secured to the edges of the funnel's bottom opening except across the forward edge of such opening, and there being free, the spiller panel being of a size and shape to close the bottom opening, but to belly downwardly to define an escape opening between its free forward edge and the forward edge of the bottom opening, and a flap hingedly supported across the forward edge of the bottom opening, and held by water reaction during use beneath the free forward edge of the spiller panel to retain the latter in closed position, but yieldable under pressure of excess fish in the funnel to allow the spiller panel to belly downwardly.

14. The combination of claim 13, wherein the edges of the bottom opening of the funnel are defined by lines to which adjoining netting is laced, the flap being hingedly connected to the line defining the forward edge of the bottom opening.

15. The combination of claim 14, including a T-shaped bracket incorporated in each of the lines defining the side edges of the bottom opening at the juncture with the line defining its forward edge, said lines which define the side edges extending thence forwardly along the funnel, and means to anchor the forward-edge-defining line at its ends to said T-shaped brackets.

16. The combination of claim 13, wherein the spiller panel and the flap are of flexible rubber.

17. A trawl net comprising a codend open at its forward end and closed during use at its after end, a funnel disposed ahead of the open forward end of the codend, to lead fish thereinto, said funnel comprising a wall of netting formed to include a spill opening for fish ahead of the entrance to the codend, with the netting terminating at the periphery of said spill opening, a spiller panel secured to said wall and normally covering said spill opening, said spiller panel comprising a sole cover for the spill opening, and means normally biasing the spiller panel into a spill opening covering position, but permitting it to open under pressure of excess fish located in the funnel substantially directly inboardly of the spill opening, and pushing outwardly against said spiller panel in a direction generally normal to the general plane of the spill opening, to permit escape of such fish.

18. A trawl net comprising a codend open at its forward end and closed during use at its after end, a funnel disposed ahead of the open forward end of the codend, to lead fish thereinto, said funnel being formed to include a spill opening for fish ahead of the entrance of the codend, and a spiller panel supported along the edges of said spill opening, but free at its forward edge, and means to normally close the spill opening by the spiller panel, but permitting it to open under pressure of excess fish gathered ahead of the entrance to the codend, to permit their escape, said means including pleating incorporated in the spiller panel and biased to normally flatten the same.

19. A trawl net comprising a codend open at its forward end and closed during use at its after end, a funnel disposed ahead of the open forward end of the codend, to lead fish thereinto, said funnel being formed to include a spill opening for fish ahead of the entrance to the codend, and a spiller panel supported along the edges of said spill opening, but free at its forward edge, to belly outwardly by pressure of escaping fish, and means to normally close the spill opening by the spiller panel, but permitting it to open under pressure of excess fish gathered ahead of the entrance to the codend, to permit their escape, said means including a flap supported by the funnel ahead of the panel's free edge, and normally underlying the same.

20. A trawl net comprising a codend open at its forward end and closed during use at its after end, a funnel extending forwardly from said codend and having a spill opening therein, and a spiller panel attached to said funnel on all sides of said spill opening except the forward side thereof, said spiller panel bellying outwardly under the weight of excess fish in the funnel during hauling, so that the excess fish are spilled out by way of said spill opening.

21. In combination with the codend of a trawl net, which during use is open at its forward end, and a funnel diverging forwardly from such open forward end and formed to include a spill opening ahead of the codend's open end, a spiller panel of a size to close said spill opening secured along its edges to the funnel except across its forward edge, and there being free and of a lateral extent to expand and belly outwardly, and flap means mounted upon the funnel across the forward edge of the spill opening, and during trawling being held backwardly beneath the free edge of the spiller panel to retain the spiller panel in position to close the spill opening of the funnel, but being swingable to move outwardly, and thereby to permit outward bellying of the spiller panel, under the influence of excess fish pressing upon said spiller panel.

References Cited by the Examiner

UNITED STATES PATENTS 2,056,772  10/36  Dahl _____ 43—9

FOREIGN PATENTS 294,363  10/16  Germany.
249,790  4/26  Great Britain.
405,405  2/34  Great Britain.

ABRAHAM G. STONE, *Primary Examiner.*

F. RAY CHAPPELL, *Examiner.*